(12) United States Patent
Ruetter et al.

(10) Patent No.: US 6,729,626 B2
(45) Date of Patent: May 4, 2004

(54) STATIC SEALING ELEMENT FOR A ROLLING BEARING

(75) Inventors: Andreas Ruetter, Pinerolo (IT); Angelo Vignotto, Turin (IT); Claudio Savarese, Airasca (IT)

(73) Assignee: SKF Industrie S.p.A., Turin (IT)

( * ) Notice: Subject to any disclaimer, the term of this patent is extended or adjusted under 35 U.S.C. 154(b) by 0 days.

(21) Appl. No.: 10/120,070

(22) Filed: Apr. 9, 2002

(65) Prior Publication Data

US 2002/0158422 A1 Oct. 31, 2002

(30) Foreign Application Priority Data

Apr. 11, 2001 (IT) .................................... TO2001A0350

(51) Int. Cl.[7] .............................................. F16C 33/76
(52) U.S. Cl. ...................... 277/637; 277/572; 277/648; 384/537; 384/486
(58) Field of Search ................. 277/551, 560, 277/562, 572, 637, 648; 384/537, 448, 486

(56) References Cited

U.S. PATENT DOCUMENTS

| 3,752,543 | A | * | 8/1973 | Schmidt | 384/484 |
| 4,043,620 | A | * | 8/1977 | Otto | 384/485 |
| 4,106,827 | A | * | 8/1978 | Ducret et al. | 384/482 |
| 4,958,942 | A | * | 9/1990 | Shimizu | 384/486 |
| 4,960,335 | A | * | 10/1990 | Otto et al. | 384/484 |
| 4,968,044 | A | * | 11/1990 | Petrak | 277/380 |
| 4,968,156 | A | * | 11/1990 | Hajzler | 384/448 |
| 5,024,449 | A | * | 6/1991 | Otto | 277/353 |
| 5,135,236 | A | * | 8/1992 | Kruk | 277/572 |
| 5,385,352 | A | * | 1/1995 | Kurose | 277/551 |
| 5,490,732 | A | * | 2/1996 | Hofmann et al. | 384/537 |
| 5,580,176 | A | * | 12/1996 | Stallmann | 384/482 |
| 5,674,011 | A | * | 10/1997 | Hofmann et al. | 384/448 |
| 6,082,905 | A | * | 7/2000 | Vignotto et al. | 384/484 |
| 6,126,322 | A | * | 10/2000 | Otsuki et al. | 384/544 |
| 6,464,399 | B1 | * | 10/2002 | Novak et al. | 384/477 |
| 6,497,514 | B2 | * | 12/2002 | Maldera et al. | 384/486 |
| 6,550,975 | B2 | * | 4/2003 | Inoue et al. | 384/537 |

FOREIGN PATENT DOCUMENTS

| EP | 1241368 A2 | * | 9/2002 |
| GB | 2207270 | * | 2/1989 |
| JP | 9-229078 | * | 9/1997 |
| JP | 2001-334806 | * | 12/2001 |

* cited by examiner

Primary Examiner—Alison K. Pickard
(74) Attorney, Agent, or Firm—Merchant & Gould, P.C.

(57) ABSTRACT

Static sealing element (1) for a rolling bearing (2) which is mounted on a cylindrical element (3) which presents a blocking moulding (4) which is positioned against an inner race (5) of the rolling bearing (2) itself and which is suitable for being arranged in contact with a shoulder (6) the sealing element (1) presenting a support (8) which is associated with the inner race (5) of the rolling bearing (2), and a sealing lip (9), which forms an integral part of the support (8) and which presents, in turn, a substantially conical end portion (17), which axially projects in relation to the blocking moulding (4) and which radially forks opposite the blocking moulding (4) itself.

6 Claims, 2 Drawing Sheets

STATIC SEALING ELEMENT FOR A ROLLING BEARING

TECHNICAL FIELD

The present invention relates to a static sealing element for a rolling bearing.

In particular, the present invention relates to a static sealing element for a roller bearing which is mounted onto a cylindrical element which presents a blocking moulding which is positioned against an inner race of the rolling bearing itself and which is suitable for being arranged in contact against a shoulder of an external element, which might, for example, be a motor shaft or a junction.

BACKGROUND

With reference to the assembly of the kind of device which has just been described above, and of which a more detailed description will be given below, without losing any of its general nature, it should be pointed out that static sealing elements of a well-known kind comprise a substantially rigid support which is suitable for being coupled to an inner race of a roller bearing and that such elements also comprise a sealing lip which forms an integral part of the support and which also extends axially beyond the blocking moulding as well as extending radially towards the interior in order to be compressed between the blocking moulding and the shoulder.

It should, however, be mentioned that the sealing capacity which is supplied by the above elements has not been found to be very efficient due, above all, to the fact that it is difficult to control the deformation of the lip during the compression between the blocking moulding and the shoulder, so that it is obvious that the aim of the present invention is to create a static sealing element which will not have the above-described disadvantages.

SUMMARY

According to the present invention a static sealing element for a rolling bearing will be produced which is mounted on a cylindrical element and which presents a blocking moulding which is positioned against an inner race of the rolling bearing itself and which is suitable for being arranged in contact with a shoulder, the element comprises a support which is associated with the inner race of the rolling bearing, and a sealing lip, which forms an integral part of the support, and which axially extends beyond the blocking moulding; the sealing element is characterised by the fact that the said sealing lip comprises a substantially conical end portion which projects axially in relation to the blocking moulding and which forks radially opposite the blocking moulding itself.

DESCRIPTION OF THE DRAWINGS

The present invention will now be described with reference to the attached drawings, which illustrate a non-limiting form of embodiment of the said invention, in which.

DETAILED DESCRIPTION

Figure 1:
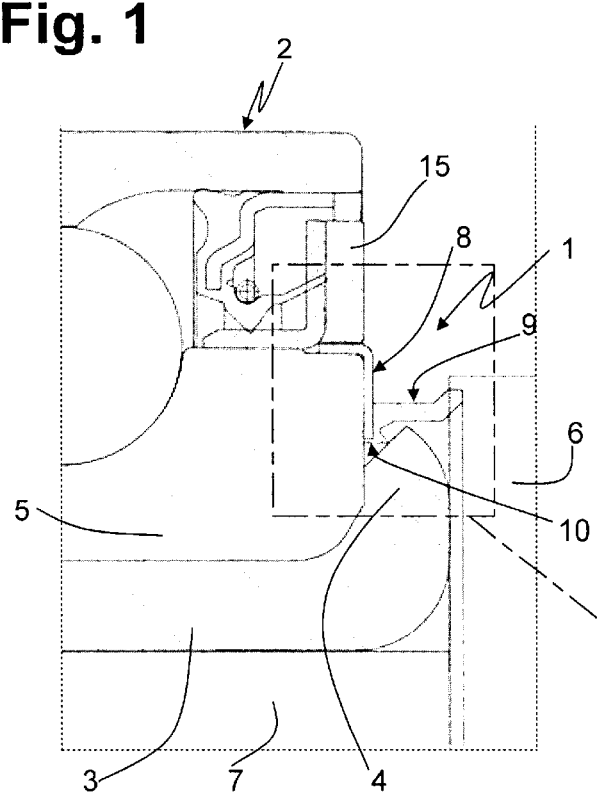
FIG. 1 is an axial section view of a first preferred form of embodiment of a sealing element for a rolling bearing according to the present invention.
Figure 1A:
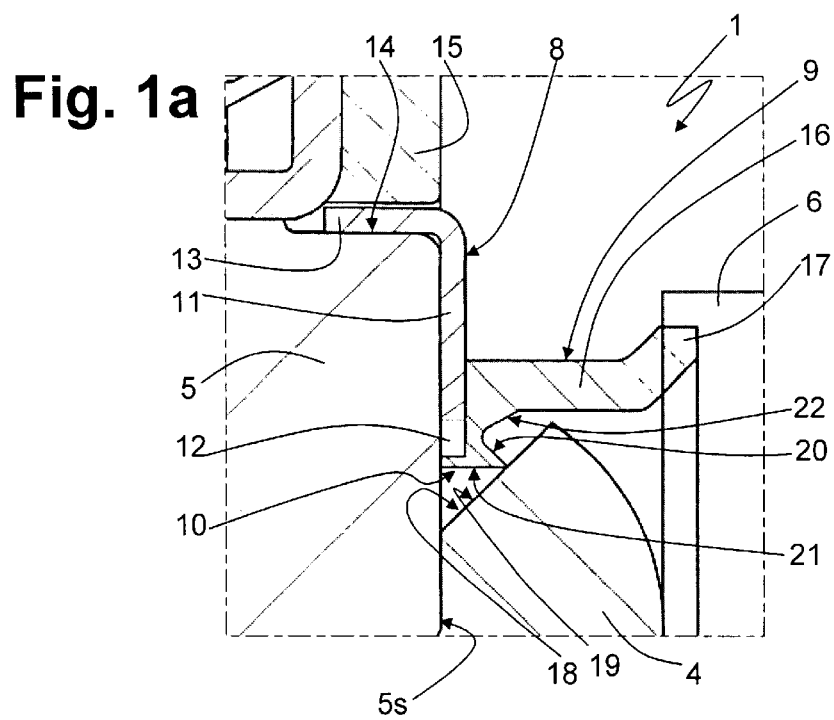
FIG. 1a is an enlarged view of a portion of the sealing element of FIG. 1.

With reference to FIGS. 1 and 1a, the number 1 indicates a static sealing element in its entirety for a rolling bearing 2.

In particular, the rolling bearing 2 is mounted on a cylindrical tube 3 which presents a blocking moulding 4 which is positioned against an inner race 5 of the rolling bearing 2, and which is suitable for being arranged in such a way that it comes into contact with a shoulder 6 of a motor shaft 7 which is inserted inside the cylindrical tube 3.

The sealing element 1 comprises a support 8 which is associated with the race 5, and also comprises two sealing lips 9 and 10 which are made of rubber-type material and which are an integral part of the support 8.

The support 8 comprises an annular wall 11, which is positioned against a frontal surface 5s of the race 5 of the rolling bearing 2, and which is radially delimited towards the inside by an elastically yieldable irregular edge 12. The edge 12 presents an internal cutoff diameter $\Phi_t$ or $\Phi_i$ which is less than an external diameter $\Phi_e$ of the blocking moulding 4, and a basic diameter $\Phi_b$ which is at least equal to the external diameter $\Phi_e$ of the blocking moulding 4 itself.

The support 8 also comprises a cylindrical wall 13 which extends from the annular wall 11, and which is transverse to the annular wall 11 itself, along an external cylindrical surface 14 of the inner race 5 in order to axially block a phonic wheel 15 which is mounted on the inner race 5 itself.

According to the form of embodiment which is illustrated in FIG. 1, the wall 13 is a continuous wall which extends around the entire circumference of the surface 14, but according to a variation which is not illustrated, the wall 13 can also be a discontinuous wall which is made up of a number of axial teeth, or only of a single axial tooth which is housed in a respective setting which is obtained in the surface 14. In both the non-illustrated variations which have just been described, as well as in the embodiment which is illustrated in FIG. 1, the wall 13 radially interferes with a part of the phonic wheel 15 in order to axially block the phonic wheel 15 itself.

The lip 9 axially extends beyond the blocking moulding 4, and it comprises a cylindrical portion 16 which extends above the blocking moulding 4 starting from the wall 13 and transverse to the wall 13 itself, and it also comprises a substantially conical end portion 17 which, starting from the portion 16, projects axially in relation to the blocking moulding 4 and forks radially opposite the blocking moulding 4 itself.

The lip 10 is axially internal in relation to the blocking moulding 4 and on one side it entirely covers the irregular edge 12, while the opposite side forks radially towards, and comes into contact with, an end surface 18 of the blocking moulding 4. The surface 18 defines the external radial dimension of the blocking moulding 4 with the diameter $\Phi_e$, and it is arranged at an angle of approximately 45° in relation to the frontal surface 5s of the inner race 5. In addition, the surface 18 and the surface 5s combine with each other in order to define an annular housing 19 with a substantially triangular transverse section, inside which the lip 10 is arranged in such a way that a frontal surface 20 and a lateral surface 21 of the lip 10 itself come respectively into contact with the surface 18 and the surface 5s in order to from a substantially acute angle.

The surface 20 of the lip 10 is connected to the portion 16 of the lip 9 by means of a curved surface 22 and it forms, with the surface 18 and the portion 16 itself, a sealing labyrinth which is not only suitable for preventing detritus from entering into the housing 19 o between the blocking moulding 4 and the inner race 5, but is also suitable for increasing the expulsion of the same detritus from the housing 19 while in operation.

The assembly of the sealing element 1 onto the rolling bearing 2 is carried out by axially forcing the edge 12 against the blocking moulding 4 in such a way as to elastically deform the edge 12 itself as well as the lip 10 in order that they may both enter the housing 19. The lip 10 is slightly undersized, in order that the lip 10 itself comes into greater contact with the surface 5s, but the shape of the lip 10 inside the housing 19 is substantially similar to that which has been previously been described.

The assembly of the sealing element 1 also determines a coupling between the wall 13 and the inner race 5 of the rolling bearing 2 with the already foreseen result that it allows a further axial blocking of the phonic wheel 15 which has previously been mounted onto the inner race 5 itself.

Once the rolling bearing 2 and the sealing element 1 have been assembled in relation to each other, the cylindrical tube 3 is mounted onto the shaft 7 in such a way as to send the blocking moulding 4 and the portion 17 of the lip 10 against and into contact with the shoulder 6 with the consequent deformation of the lip 10 itself. The radially forked shape of the portion 17 towards the outside determines an elastic increase in the circumference of the entire lip 10 and, thus, also in the portion 16 and this phenomenon creates an elastic reaction force which serves to increase the adherence between the portion 17 and the shoulder 6 to the advantage of the sealing capacity of the sealing element 1.

Figure 2:
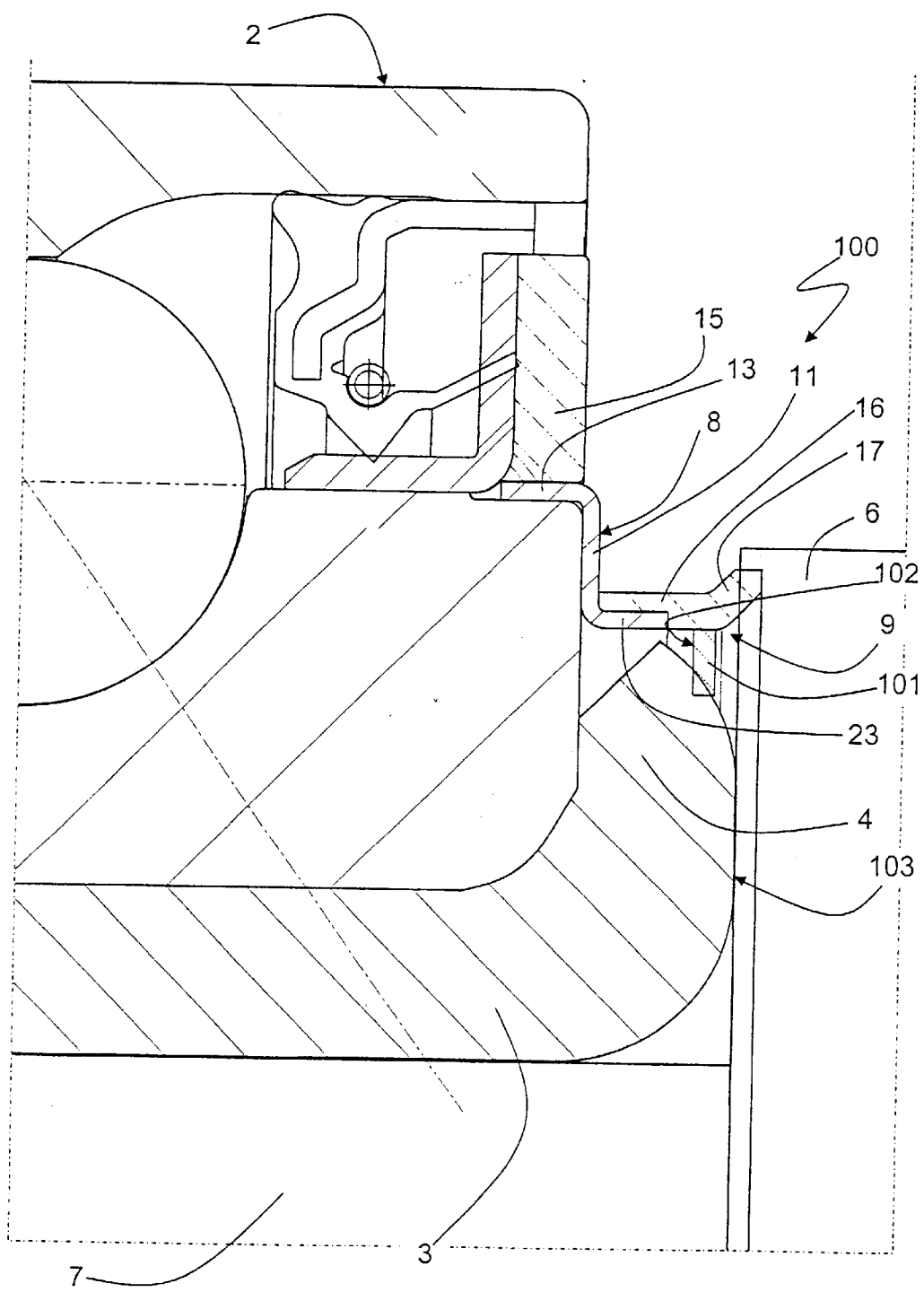
FIG. 2 is an axial section view of a second preferred form of embodiment of a sealing element for a rolling bearing according to the present invention as illustrated in FIG. 1.

In the case that it is necessary to exercise more control over the deformation or to further increase the elastic reaction force of the portion 16, it could be useful to use the alternative form of embodiment of the sealing element 1 which is illustrated in FIG. 2, which illustrates a sealing element 100 which differs from the sealing element 1 due mainly to the fact that the support 8 has a different shape.

In fact, the support 8 of the element 100 comprises an additional cylindrical wall 23 which extends from the annular wall 11, and which is transverse to the wall 11 itself, and which is opposite the wall 13 so that it replaces part of the rubber material of the portion 17 in such a way as to render the portion 17 more rigid.

In the form of embodiment which is illustrated in FIG. 2, the wall 23, the internal diameter of which is greater than the diameter $\Phi_e$, completely replaces the edge 12 and the lip 10 but, obviously, it is easy to produce a support 8 which contains the wall 23 itself as well as the edge 12 and the lip 10 in such a way as to combine the effect of a greater rigidity of the lip 9 with the effect of a greater sealing capacity of the housing 19.

In addition, the element 100 can also comprise a further sealing lip 101, which is integral with the lip 9 and which is substantially arranged between the portion 17 and the portion 16 itself. The lip 101 extends radially towards the blocking moulding 4, and it comprises a rear surface 102, which is transverse to the lip 9 and which is arranged in contact with an external surface 103 of the blocking moulding 4 itself and which directly faces the shoulder 6. In particular, if the form of embodiment of the element 100 provides for the presence of the lip 9 as well as the lip 101, housing 19 is protected by both lips and thus is doubly insulated from the outside.

It is intended that the present invention not be limited by the forms of embodiment which are herein described and illustrated, which are to be considered as examples of forms of embodiment of the sealing elements 1 and 100, and which may be susceptible to further modifications in relation to the shape and arrangement of the parts, as well as details pertaining to construction and assembly.

What is claimed is:

1. Static sealing element for a rolling bearing which is mounted on a cylindrical element and which presents a blocking moulding positioned against an inner race of the rolling bearing and which is suitable for being arranged in contact with a shoulder, the element comprising:

a support which is associated with the inner race of the rolling bearing, and a sealing lip, which forms an integral part of the support, and which axially extends beyond the blocking moulding; and a further sealing lip, which is axially internal in relation to the blocking moulding and which forks radially opposite the blocking moulding;

wherein the sealing lip comprises a substantially conical end portion which projects axially in relation to the blocking moulding and which forks radially opposite the blocking moulding; and wherein the further sealing lip comprises a frontal surface which comes into contact with an end surface of the blocking moulding as well as a lateral surface which comes into contact with the inner race and which defines a substantially acute angle with the frontal surface.

2. Sealing element according to claim 1, wherein the support comprises blocking means which extend along an external surface of the inner race in order to axially block a decoder which is mounted on the inner race.

3. Sealing element according to claim 1, wherein the support comprises stiffening means which extend axially towards an outside of the rolling bearing in order to at least partially render more rigid the sealing lip.

4. Static sealing element for a rolling bearing which is mounted on a cylindrical element and which presents a blocking moulding positioned against an inner race of the rolling bearing and which is suitable for being arranged in contact with a shoulder, the element comprising:

a support which is associated with the inner race of the rolling bearing, and a sealing lip, which forms an integral part of the support, and which axially extends beyond the blocking moulding; and a further sealing lip which is integral with the sealing lip, and which extends radially from the sealing lip towards the blocking moulding, and which is arranged so as to come into contact with an external surface of the blocking moulding;

wherein the sealing lip comprises a substantially conical end portion which projects axially in relation to the blocking moulding and which forks radially opposite the blocking moulding.

5. Sealing element according to claim 4, wherein the further sealing lip is arranged substantially near the end portion and comprises a rear surface which is arranged transverse to the lip and which comes into contact with the external surface.

6. Static sealing element for a rolling bearing which is mounted on a cylindrical element and which presents a blocking moulding positioned against an inner race of the rolling bearing and which is suitable for being arranged in contact with a shoulder, the element comprising:

a support which is associated with the inner race of the rolling bearing, and a sealing lip, which forms an integral part of the support, and which axially extends beyond the blocking moulding;

wherein the sealing lip comprises a substantially conical end portion which projects axially in relation to the blocking moulding and which forks radially opposite the blocking moulding;

wherein the support comprises an annular wall which presents an elastically yieldable internal edge with an internal diameter which is less that an external diameter of the blocking moulding; and wherein the internal edge is an irregular edge which presents a cut-off diameter which is equal to the internal diameter, and a basic diameter which is at least equal to the external diameter of the blocking moulding.

* * * * *